Patented Sept. 22, 1953

2,653,135

UNITED STATES PATENT OFFICE 2,653,135

SURFACE ACTIVE COMPOUNDS

William B. Hughes and Everett B. Fisher, Bartlesville, Okla., assignors to Cities Service Research and Development Company, New York, N. Y., a corporation of New Jersey No Drawing. Application January 4, 1951, Serial No. 204,472

4 Claims. (Cl. 252—338)

This invention relates to new compositions of matter having surface active properties and more particularly to certain amine salts of substituted naphthalene sulfonic acids which are particularly useful in the breaking of emulsions such as oil field emulsions.

One of the most troublesome problems met with in crude oil production relates to the breaking of water-in-oil emulsions formed in wells producing both water and brine. These emulsions are generally of two types, the first type a mechanically cut emulsion, which is usually formed in the well by faulty pumping equipment, the other type being a gas-cut emulsion, the formation of which is aided by the emulsifying action of certain asphaltenes and other chemical emulsifiers present in the crude oil. The emulsion commonly encountered is a mixture of both of these types, and its properties will vary from well to well, and even from day to day in the same well. Unless these emulsions can be effectively and completely broken, the oil content is lost. It is also desirable that the emulsion be broken as rapidly as possible, in order to keep the size and number of settling tanks to a minimum.

There are apparently two phases of an emulsion resolving problem. The first involves a surface phenomenon in which the oil film surrounding the water particles of micron size is weakened, allowing the particles to coalesce into larger droplets. This phase will be hereinafter referred to as the emulsion breaking step. The other phase involves the splitting of the broken emulsion into separate oil and water phases. This phase will be referred to as the water separation step.

It will be evident from the foregoing that the ideal emulsion resolving agent must be effective to break both mechanical-cut and gas-cut emulsions with substantially equal facility, must rapidly break the emulsion, and must be effective in causing rapid water separation from the broken emulsion. The agent must also be effective in very small concentrations, in order to hold treating cost to a minimum.

It is an object of this invention to provide a series of compounds which will rapidly resolve emulsions of all types, giving rapid break and complete water separation, and which are effective in very small concentration.

It has been found that emulsion resolving agents which will accomplish the foregoing object may be produced by reacting an aliphatic aldehyde higher than formaldehyde with a mixture of a polyethylene amine and an aliphatic amine, and neutralizing the reaction product with a propylated naphthalene sulfonic acid.

The intermediate aldehyde-amine reaction product is prepared by reacting from one to three mols of aldehyde with one mol of the mixed amines. The aldehyde may be acetaldehyde or any other higher aliphatic aldehyde. Formaldehyde should not be used since it apparently polymerizes under the conditions of the reaction. Generally, better results are obtained as the molecular weight of the aldehyde increases. The polyethylene amine may be diethylenetriamine, triethylenetetramine, or tetraethylenepentamine, and should preferably be present in the mixed amines in the amount of from 25 to 75 per cent of the mixture, the remainder of the mixture being an alkyl amine, preferably, but not necessarily, of more than 4 carbon atoms. Products made utilizing only polyethylene amines are generally too oil-insoluble to be valuable as emulsion breakers, while products utilizing alkyl amines alone, while oil-soluble, do not possess the desirable qualities of compositions made from the mixed amines. In treating certain emulsions, however, proportions outside of 25 to 75 per cent polyethylene amine are satisfactory.

The exact nature of the aldehyde-amine product is not known, but is probably a mixture of a great number of different possible products of the reaction. It has been found that the conditions under which the products are reacted also makes a considerable difference in their properties. Thus, the amines and the aldehyde will react spontaneously when mixed, the temperature of the reaction mixture rising to 80–90° C. This product, when neutralized, is not, however, a good breaking agent. In order to produce the most effective compositions, it has been found necessary to heat the reaction mixture to a temperature just under its boiling point, which will vary, depending on the particular reactants, but which will be about 120–140° C. for mixtures using a long chain aldehyde such as heptaldehyde, and amines of six or more carbon atoms. The mixture should then be held at this temperature for a period of from one-half to one hour. If heated for more than one hour, the effectiveness of the finished composition is decreased.

After heating, the aldehyde-amine product is cooled, and it is neutralized to a methyl orange end point with propylated naphthalene sulfonic acid prepared according to the directions given by Walker in U. S. Patent No. 1,873,165. The compound has the formula:

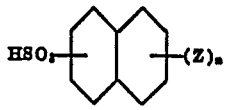

in which Z is an isopropyl radical and n is a whole number from 1 to 4. Other acids used to neutralize the aldehyde-amine product, such as stearic acid and petroleum green acids, yielded products far inferior in emulsion-breaking qualities.

In order that those skilled in the art may more fully appreciate the character of our new compositions, and their method of preparation, the following example is given, which is illustrative of the preparation of a typical composition.

Example

Two mols (228 grams) of heptaldehyde, 1.25 mols (298 grams) of a commercial mixture of alkyl amines averaging twelve carbon atoms to the molecule, and 0.75 mol (142 grams) of tetraethylenepentamine were mixed and heated at about 140° C. for one hour. The mixture was then cooled, and five mols (1500 grams) of propylated naphthalene sulfonic acid was added. The neutralization is accompanied by the evolution of considerable heat, and no further heating was necessary to bring the reaction to completion. The final product, when cooled, was a heavy viscous liquid, too viscous to inject directly into an oil field gathering line. It was therefore mixed with an equal volume of kerosene, the kerosene-product mixture being of a suitable viscosity for oil-field use.

The various products produced as described above have been subjected to various tests, both in the field and in the laboratory, and have proven outstanding in breaking water-in-oil emulsions, such as are commonly met with in oil production. While the effectiveness of these compounds will vary from well to well depending upon the emulsion produced by the particular well, it has been found that excellent results have been obtained when the products are used in concentrations as low as 60 parts per million, and they are in general far superior to the best of the commercial breakers now on the market, which are generally ineffective at concentrations less than 250 parts per million.

Having now described our invention, what we claim as new and useful is:

1. The process of resolving emulsions which includes mixing with a petroleum water-in-oil emulsion a resolving agent consisting of a product prepared by mixing together from one to three mols of an aliphatic aldehyde having more than one carbon atom and one mol of a mixture of a polyethylene amine and an alkyl amine having more than four carbon atoms, heating the aldehyde-amine mixture for a period of from about one half to one hour at a temperature slightly below the boiling point of the mixture, and neutralizing the resultant product to a methyl orange end point with propylated naphthalene sulfonic acid, the agent being mixed in an amount small but sufficient to cause substantial resolution of the emulsion, allowing the treated emulsion to settle into an oil phase and a water phase, and separating the oil from the water.

2. The process according to claim 1 in which the mixture of amines consists essentially of from 25 percent to 75 percent of a polyethylene amine, the balance being an alkyl amine of more than four carbon atoms.

3. The process of resolving emulsions which includes mixing with a petroleum water-in-oil emulsion a resolving agent consisting of a product prepared by mixing one mol of heptaldehyde and about one mole of a mixture of amines containing from 25 percent to 75 percent of a polyethylene amine, the balance being a mixture of alkyl amines averaging twelve carbon atoms to the molecule, heating the aldehyde-amine mixture for a period of from one-half to one hour at a temperature of from 120° to 140° C. and neutralizing the resultant product to a methyl orange end point with propylated naphthalene sulfonic acid, the agent being mixed in an amount small but sufficient to cause substantial resolution of the emulsion, allowing the treated emulsion to settle into an oil phase and a water phase, and separating the oil from the water.

4. The process of resolving emulsions which includes mixing with a petroleum water-in-oil emulsion a resolving agent consisting of a product prepared by mixing two mols of heptaldehyde, one and one quarter mols of a mixture of alkyl amines averaging twelve carbon atoms to the molecule, and three quarters of a mol of tetraethylenepentamine, heating the aldehyde-amine mixture for a period of about one hour at a temperature of about 140° C., and neutralizing the resultant product to a methyl orange end point with propylated naphthalene sulfonic acid, the agent being mixed in an amount small but sufficient to cause substantial resolution of the emulsion, allowing the treated emulsion to settle into an oil phase and a water phase, and separating the oil from the water.

WILLIAM B. HUGHES.
EVERETT B. FISHER.

References Cited in the file of this patent

UNITED STATES PATENTS

| Number | Name | Date |
|---|---|---|
| 2,083,225 | De Groote | June 8, 1937 |
| 2,223,935 | Daniels et al. | Dec. 3, 1940 |
| 2,321,496 | Liberthson | June 8, 1943 |